United States Patent [19]

Meiers

[11] Patent Number: 4,517,795
[45] Date of Patent: May 21, 1985

[54] BALE-SHAPE GAUGE FOR BALER FOR FORMING CYLINDRICAL BALES
[75] Inventor: Gerald F. Meiers, Ottumwa, Iowa
[73] Assignee: Deere & Company, Moline, Ill.
[21] Appl. No.: 98,280
[22] Filed: Nov. 28, 1979
[51] Int. Cl.³ .......................................... A01D 39/00
[52] U.S. Cl. ............................ 56/341; 56/DIG. 15; 100/88; 100/99
[58] Field of Search ..................... 100/88, 99; 56/341, 56/DIG. 15

[56] References Cited

U.S. PATENT DOCUMENTS

| 4,065,914 | 3/1982 | Phillips et al. | 56/341 |
| 4,150,527 | 4/1979 | Meiers | 56/341 |
| 4,224,867 | 9/1980 | Gaeddert | 100/88 |

OTHER PUBLICATIONS

Hesston/Rounder Open-Throat Round Balers, Models (5580, 5540, 5500), p. 4, copyright 1979.
U.S. Patent Application Serial No. 098,280, Gerald F. Meiers (Inventor), Baler-Shape Gauge for Baler for Forming Cylindrical Bales; filed Nov. 28, 1979.

Primary Examiner—Paul J. Hirsch

[57] ABSTRACT

A large cylindrical baler with a gauge for indicating the relative diameters of a bale being formed in the bale-forming chamber at two axially-spaced points on the bale periphery. The baler comprises a bale-forming chamber defined in part by a conveyor comprised of a plurality of endless loop belts. A belt-tensioning and take-up mechanism tensions all of the belts responsive to the diameter of the largest diameter portion of the bale during formation. The gauge has a pair of feelers engaging two of the belts in engagement with the periphery of the bale at two remote, axially-spaced points on the bale periphery. An indicator is positioned remotely of the bale-forming chamber and is interconnected with the pair of feelers through a signal transmitting means for transmitting a signal to the indicator responsive to the variation in tension of the two belts. The tension of the two belts is directly related to the relative diameters of the bale at the two points on the bale periphery engaged respectively by the two belts.

7 Claims, 7 Drawing Figures

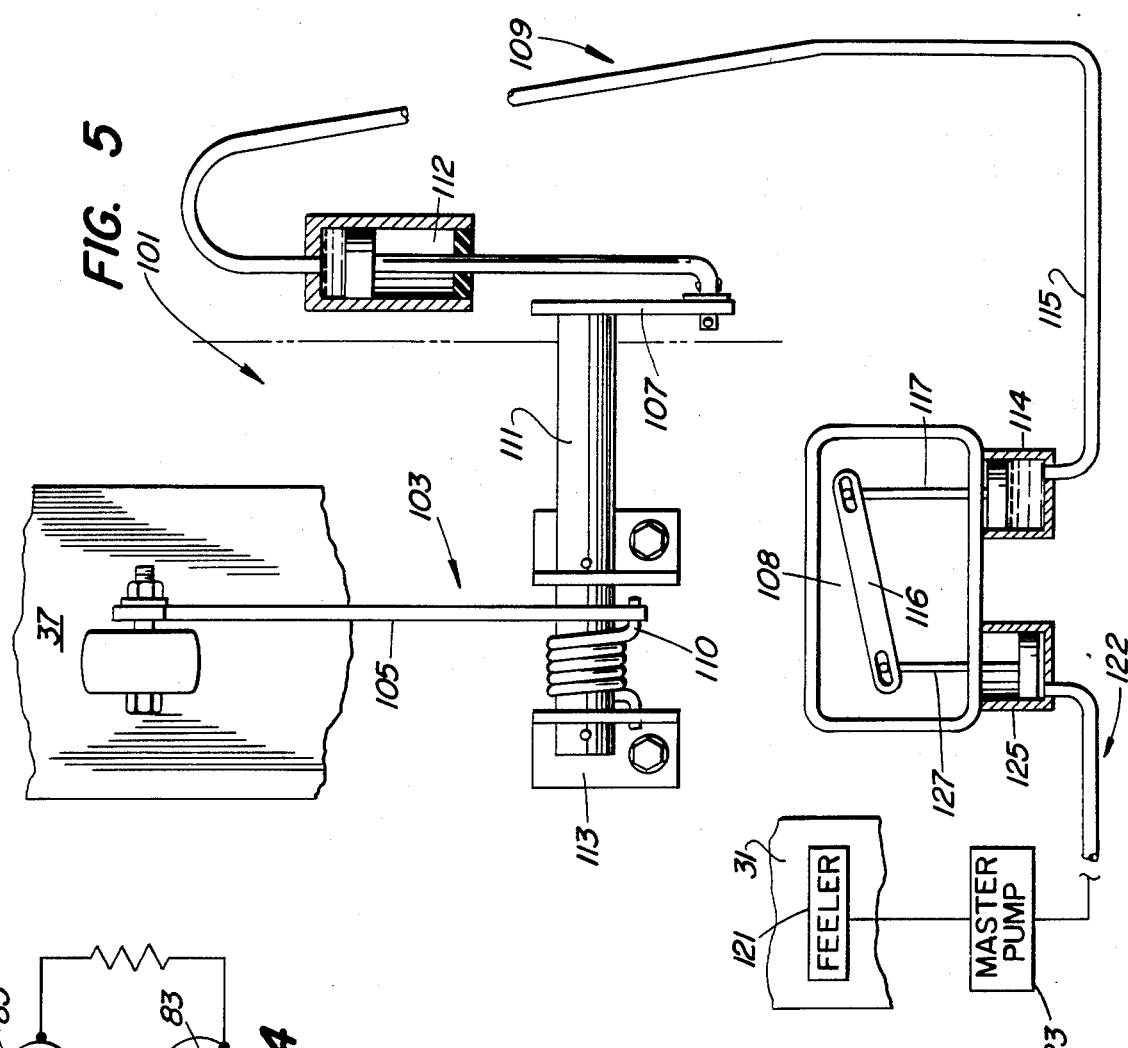
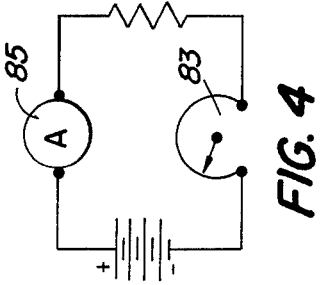
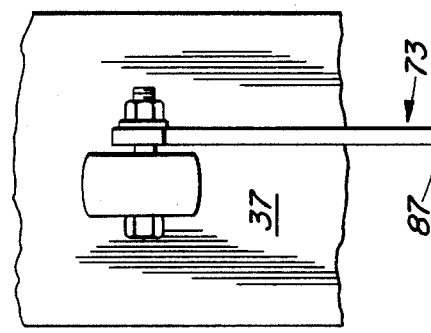
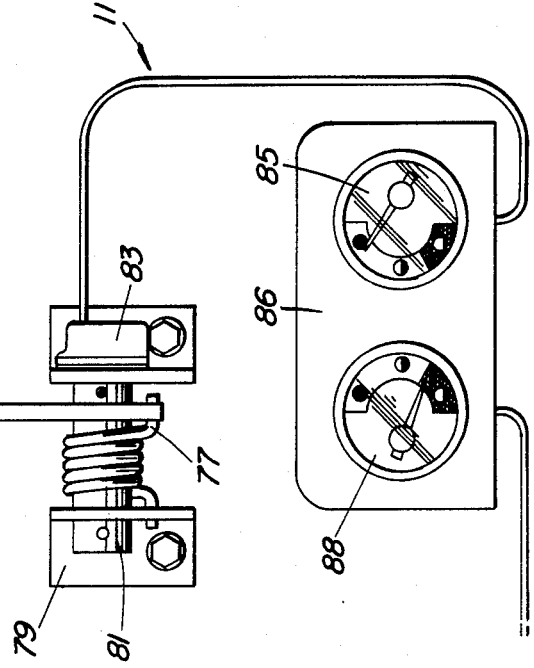

BALE-SHAPE GAUGE FOR BALER FOR FORMING CYLINDRICAL BALES

BACKGROUND OF THE INVENTION

This invention is directed to balers for forming cylindrical bales hereinafter referred to as cylindrical baler and more particularly to such balers with a gauge for monitoring the uniformity of the diameter of the cylindrical bale during formation.

One conventional type of cylindrical balers generally comprises a crop pickup which delivers the crop into a bale-forming or baling chamber formed at least in part by a belt-type conveyor moveably mounted around transverse rollers. During formation the bale may be supported in the baling chamber either above the ground (off-ground rolled type) or on the ground (ground rolled type). The belt conveyor envelops at least a part of the upper portion of the bale to rotate the bale and the incoming mat of crop from the pickup into an increasingly larger cylindrical bale. After the bale reaches a predetermined size, the belt conveyor is pivoted away from the bale such that the bale may be discharged rearwardly from the chamber. Current commercial versions of such balers form bales ranging in size between 90 cm. to 170 cm. in width (measured along the longitudinal axis of the bale), 120 cm. to 210 cm. in diameter and 200 kg. to 1400 kg. in weight. The bales are typically stored unsheltered in the field and, thus, it is necessary that they be of a shape and density to retard spoilage due to weather.

A cylindrical baler of the ground-rolled type is disclosed, for example, in U.S. Pat. No. 4,012,892. Cylindrical balers of the off-ground, rolled type are disclosed, for example, in U.S. Pat. No. 3,931,702 and U.S. Pat. No. 4,150,527. Such balers are operated by being pulled by a tractor with the baling chamber aligned transverse to the direction of movement. The bale is started by feeding the windrow (usually between 60 cm. and 150 cm. in width) into the middle of the baler followed by feeding the windrow into one side of the baler and then the other to form a uniform diameter bale core in the bale-forming chamber. After the core is formed, the bale chamber is alternately fed on each side for longer periods of time to generate a bale of substantially uniform size and density throughout the formation process. Heretofore the determination of when the feeding of hay should be shifted from one side of the bale chamber to the other has been made by the operator turning around to face the baler from his position facing in the direction of motion of the tractor and observing the bale being formed in the bale-forming chamber. This method is inconvenient, lacks exactness, causes operator fatigue and relies on the experience of the operator to interpret correctly his observations relative to the uniformity of diameter of the bale being formed and to the need to shift from feeding of one side to the opposite side of the baling chamber.

In the event that a substantially uniform diameter of the bale is not maintained, an egg-shaped or pear-shaped bale is formed. This may allow or cause one of the outer belts of the upper conveyor adjacent the smaller diameter end(s) to fall off the end of the bale and jam the bale-forming chamber. In addition, the nonbalanced formation of the bale may also cause the formation of low density areas on the bale periphery which may lead to or cause premature deterioration of the bale during storage of the bale in the field. The deterioration is due to the fact that low density peripheral portions of the bale do not shed rain properly or as well as a bale of substantially uniform shape and density on the outer periphery of the bale exposed to the weather.

OBJECTS AND SUMMARY OF THE INVENTION

Accordingly, it is an object of this invention to provide a cylindrical baler with a gauge which simplifies the bale-forming process, reduces operator fatigue, enables the more exact determination of the bale shape during formation and relies less on the experience of the operator.

Another object of the invention is to provide an improved cylindrical baler having a bale-shape gauge with a remotely visible indicator.

Another object of this invention is to provide an improved baler which enables formation of a cylindrical bale with a more uniform shape and density.

These and other objects of the invention which will be apparent from a consideration of the following detailed description in conjunction with the accompanying claims are accomplished by providing a cylindrical baler with a gauge for continuously indicating, throughtout a preselected range of diameter differences the relative diameters of a bale being formed in a bale-forming chamber at two axially-spaced points on the bale periphery. The baler comprises a mobile frame and a bale-forming chamber defined generally by the frame and by a conveyor comprised of a plurality of loop means (preferably belts) supported on the mobile frame. A tensioning and take-up mechanism is provided for tensioning the loop means and for adjusting the length of the span of the loop means of the conveyor in engagement with the periphery of the bale being formed in the chamber in response to the increase in diameter of the largest diameter portion of the bale.

In one preferred embodiment of the bale-shape gauge, the gauge comprises a pair of feelers, respectively engaging two belts (loop means) of the conveyor which are in engagement with the periphery of the bale at two remote, axially-spaced points on the bale periphery. An indicator is positioned remotely of the bale-forming chamber and is interconnected with the pair of feelers through a signal transmitting means for transmitting a signal to the indicator responsive to the variation in tension of the two belts. The feelers thus move through a preselected range having one end point corresponding to the bale diameter existing under a fully tensioned belt and another end point corresponding to the bale diameter existing under a fully slackened belt. One embodiment of the transmitting means is an electrical circuit including a rheostat for continuously generating an output signal proportional to the degree of angular rotation of the feeler. Another embodiment of the transmitting means includes a pair of master piston-type fluid pumps and a pair of slave piston-type fluid pumps each connected respectively to one of the master pumps through a fluid filled tube. Each master pump is operated responsive to the position of respective ones of the feelers and each slave pump is operated responsive to respective ones of the master pumps. The indicator is connected to the slave pumps and provides a continuous remotely visible indication of the positions of the feelers and hence of the differences in diameters of the bale at the points thereof respectively beneath the belts engaged by the feelers.

BRIEF DESCRIPTION OF THE DRAWINGS

FIG. 3 is an enlarged, fragmentary view of the gauge shown in FIGS. 1A, 1B.

FIG. 4 is a circuit diagram for a portion of the gauge shown in FIG. 3.

FIG. 5 is a fragmentary, partially schematic view of a second embodiment of a gauge in accordance with the features of this invention.

DESCRIPTION OF THE PREFERRED EMBODIMENT

Figure 1A:
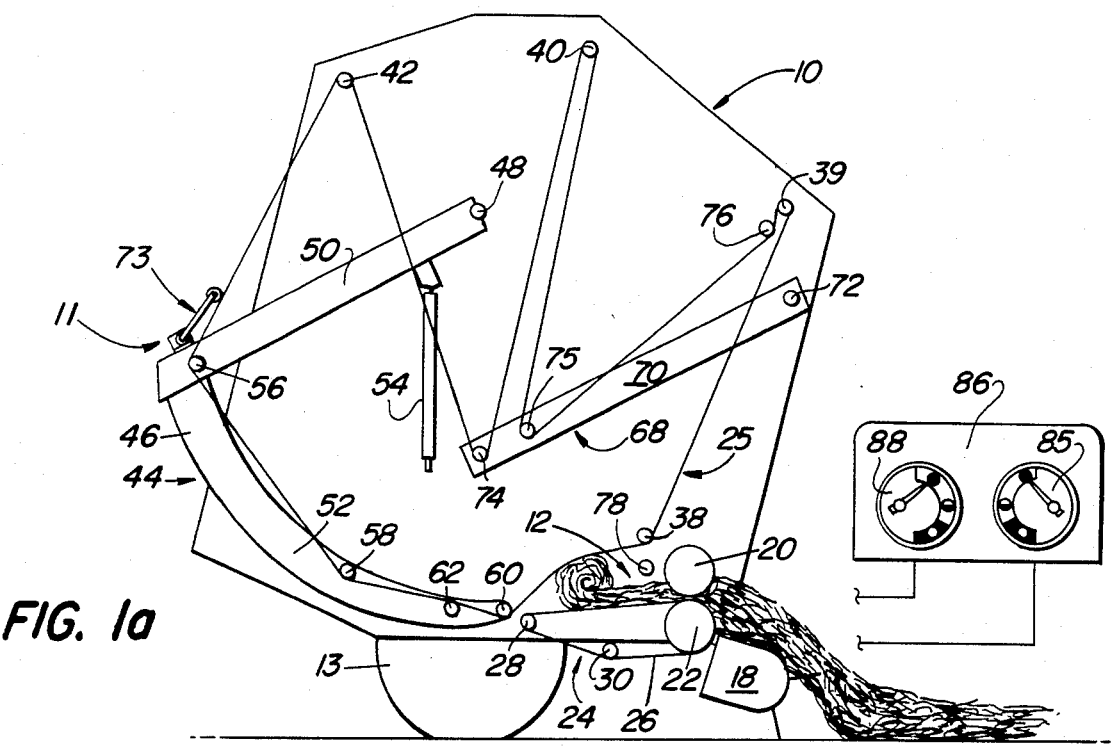
FIG. 1A is a schematic, vertical, fore-and-aft, sectional view of one embodiment of a baler in accordance with the features of this invention at the initiation of bale formation.
Figure 1B:
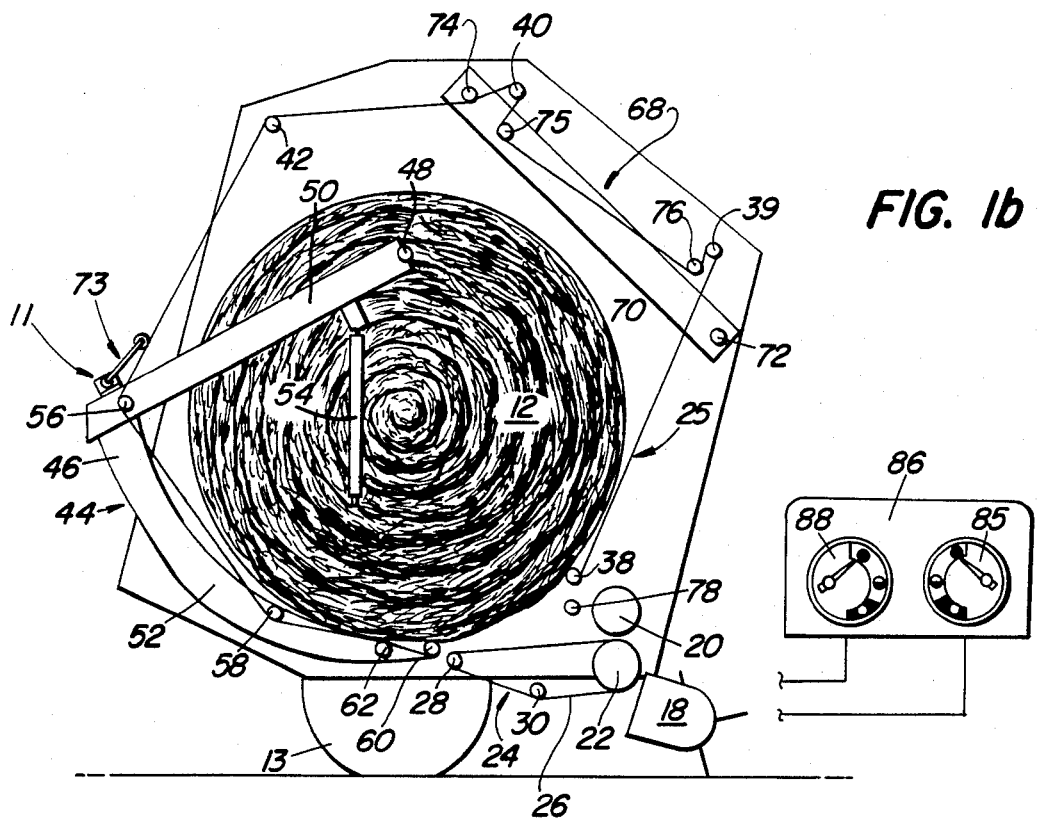
FIG. 1B is a schematic, vertical, fore-and-aft, sectional view of the baler shown in FIG. 1A at the completion of bale formation.

Reference is made to FIGS. 1A, 1B which are schematic, vertical, fore-and-aft, sectional views of a baler 10 for forming large cylindrical bales in accordance with the preferred embodiment of this invention. FIG. 1A illustrates baler 10 at the initiation of bale formation and FIG. 1B illustrates baler 10 at the completion of bale formation. Also reference is made to FIG. 2A which shows a rear elevational view of baler 10. Baler 10 is preferably of the type disclosed in U.S. Pat. No. 4,150,527 (the disclosure of which is hereby incorporated by reference herein) except for a gauge 11 for indicating the relative diameters of a bale being formed in a bale-forming chamber 12 of baler 10 at at least two axially-spaced points on the bale periphery in accordance with the features of this invention. As baler 10 (except for gauge 11) is conventional, it will only be briefly described herein to the extent necessary to understand the features of gauge 11. Baler 10 includes a mobile main frame 14 mounted on a pair of laterally-spaced wheels 13, 15. Baler 10 is connectable and towable (from left to right in FIG. 1A) by a tractor (not shown) through a forwardly extending implement tongue (not shown) that is connected to main frame 14. The main frame also includes a pair of opposite, upright, fore-and-aft sides 16, 17 at opposite sides of the machine.

A pickup mechanism 18 is mounted at the forward end of main frame 14 and operates to raise crop material from a windrow in the field as baler 10 advances and delivers it upwardly and rearwardly between a pair of compression rolls 20, 22. Rolls 20, 22 compress the crop material into a mat and deliver the mat rearwardly into bale-forming chamber 12 defined by sides 16, 17, the upper run of a belt-type lower conveyor 24 and the lower run of an upper conveyor 25. Conveyor 24 includes a single belt 26 which spans the width of the baler between opposite sides 16, 17 and is trained around a transverse rear roller 28, a lower compression roller 22 and a belt-tensioning idler 30.

Conveyor 25 is disposed between opposite sides 16, 17 and includes a plurality of flexible loop means here shown as endless belts 31, 32, 33, 34, 35, 36, 37, disposed side by side across the width of the baling chamber between the opposite sides 16, 17. The belts 31–37 are trained around a lower front transverse roller 38, a front upper roller 39, a center upper roller 40, and a rear upper roller 42, all of which extend transversely between the opposite frame sides and are journaled therein. While the loop means are preferably endless belts, it will be appreciated that chains or other equivalent means may be used in lieu of belts.

Main frame 14 also includes a rear gate assembly 44 including a pair of L-shaped arms 46, 47 at opposite sides of the machine and swingably mounted on pivots 48, 49 at the upper forward ends of the arms for swinging between a closed, operating position (FIGS. 1, 2) and a raised, discharge position (not shown) wherein rearward discharge of a bale from baling chamber 12 is permitted. Arms 46, 47 include, respectively, upper arm portions 50, 51 connected to pivots 48, 49 and arcuate lower arm portions 52, 53 which are rigidly attached to and extend downwardly and forwardly from the rearward end of upper arm portion 50, 51. A pair of hydraulic cylinders 54 (only one being shown) are connected at their lower ends to the main frame and at their upper ends connected to the upper arm portions 50, 51. Rear gate assembly 44 is swingable back and forth between its closed or operating position and its raised discharge position by extension and retraction, respectively, of the pistons of cylinders 54.

Rear gate assembly 44 further includes a plurality of transverse rollers 56, 58, 60, 62 extending between arms 46, 47 and about which belts 31–37 are trained. Belts 31–37 move from the roller 60 to the roller 38. The lower runs of belts 31–37 between the rollers 60 and 38 are expandable into a loop that defines, in part, baling chamber 12. The loop expands as the bale grows in size. To accommodate the growing bale, a loop means tensioning and take-up mechanism 68 is provided and comprises a pair of arms 70 (only one being shown) pivotally mounted at 72 on opposite frame sides 16, 17, respectively, and a pair of idler rollers 74, 75 carried between the rearward ends of arm 70. Idler rollers 74, 75 engage the upper surfaces of the belt on opposite sides of the center top roller 40 and move counterclockwise about pivot 72 as the bale increases in size to reduce the loops on the opposite sides of the roller 40 and in turn to accommodate the added length of belt necessary in baling chamber 12. Springs (not shown) are provided to bias arms 70 downwardly to tension belts 31–37 at all times including when chamber 12 is empty. Belts 31–37 are driven by a drive system connected to one or more of the rollers. It is contemplated that roller 36 is the drive roller in this illustrated embodiment with an idler roller 76 being provided to increase the belt wrappage on roller 38. The drive system is connected to the tractor power take-off and is driven thereby. A stripper roller 78 is provided below the lower front roller 38 and rearwardly adjacent to the upper compression roller 20 to strip material from the belts as the belts leave the baling zone.

Figure 2A:
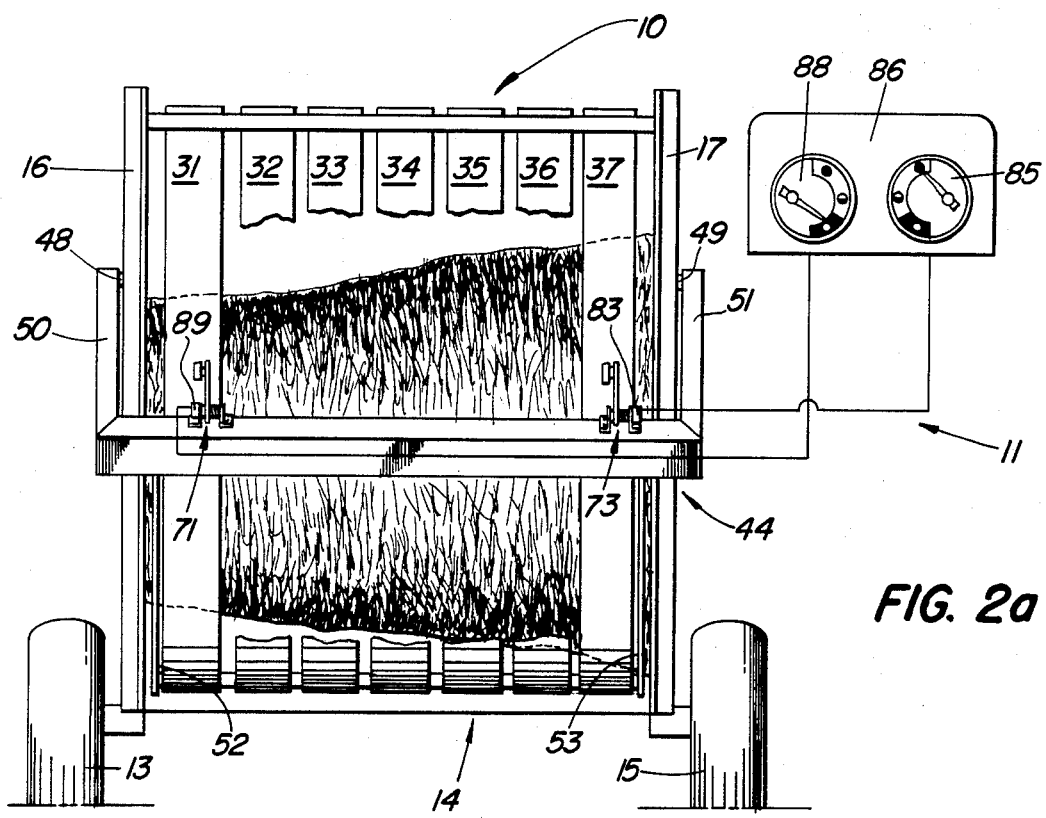
FIGS. 2A, 2B are rear, elevational views of the baler shown in FIG. 1 illustrating respectively the operation of the baler with bales of two different shapes during formation.
Figure 2B:
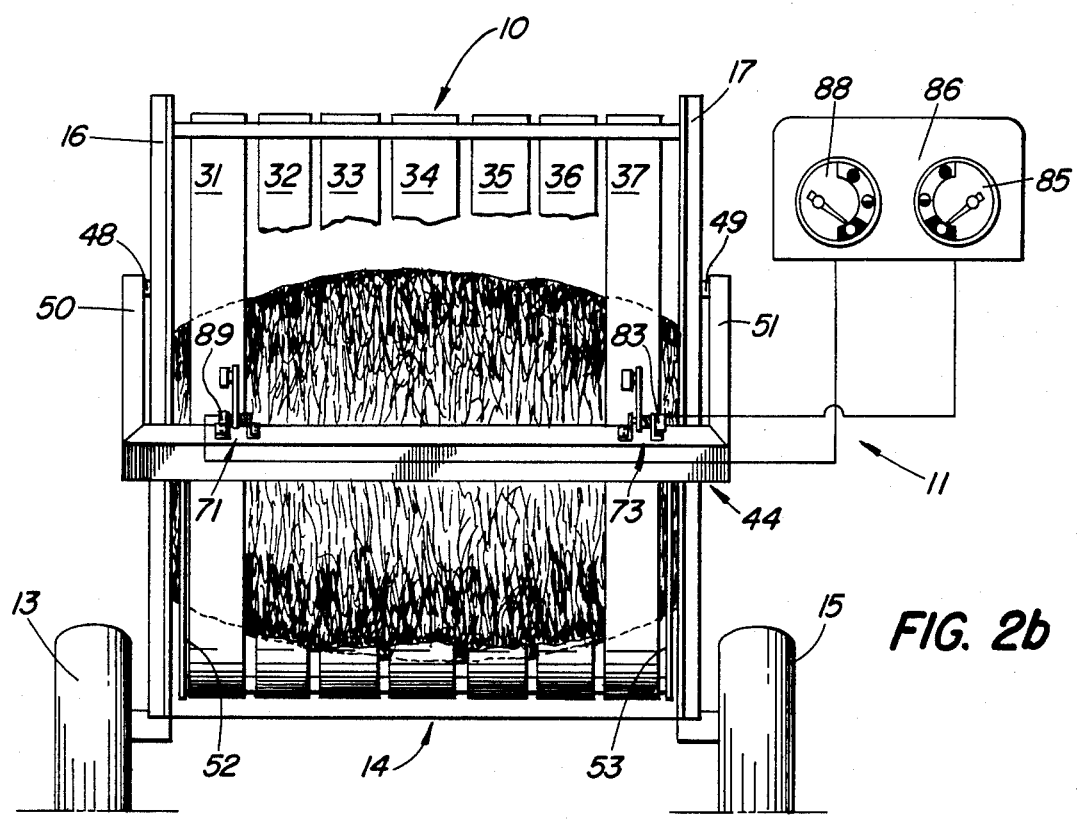

In accordance with the features of this invention and primarily referring to FIG. 3 which is an enlarged fragmentary view of gauge 11 as viewed in FIGS. 2A, 2B, gauge 11 is provided for indicating the relative diameters of a bale being formed in the baling chamber 12 at two axially-spaced points on the bale periphery. Gauge 11 includes a pair of sensing means for continuously monitoring the difference in diameter along the length of a bale, the pair of sensing means being in the form of a pair of belt-engaging feelers 71, 73 mounted adjacent the rear ends of upper arm portions 50, 51; a signal transmitting means 83, 89 responsive, respectively, to the position of feelers 71, 73; and an indicator 86 located remotely from feelers 71, 73 and preferably in the cab of the tractor used to tow baler 10. Feeler 73 comprises an arm 87 pivotally mounted in bracket 79 on a pivot 81. Arm 87 is biased into engagement with adjacent belt 37 via a coil spring 77 connected between brackets 79 and the rear end of arm 87. In this embodiment signal transmitting means 83 is comprised of a conventional rheostat fixed to bracket 79 and having a rotor shaft (not shown) fixed to pivot 81 for sending a signal responsive to the angular rotation of pivot 81 to a dial indicator 85 of indicator 86. Other conventional means such as one or more limit switches, may be used rather than a rheostat to comprise transmitting means 83. Feeler 71, identical in construction to feeler 73, includes a pivotally mounted arm which is spring biased into engagement with adjacent belt 31. The degree of angular rotation of the arm of feeler 73 is transmitted to a second dial indicator 88 of indicator 86 via transmitting means 89 identical to transmitting means 83 and preferably a rheostat of a conventional construction.

Dial indicators 85, 88 may be ammeters of a conventional construction. One preferred type of dial indicator is known as a bitorque magnetic gauge and is available from Stewart Warner Co., Chicago, Ill. The dial face is, of course, provided with appropriate indicia to indicate the degree of belt tensioning which is directly relatable to the relative diameters, over a range of differences in diameter, of the bale at the two axially-spaced points on the bale periphery. Ammeters 85, 88 may be connected respectively in circuit with the rheostats 83, 89 in any conventional manner such as shown for example in FIG. 4 for rheostat 83. In operation when chamber 12 is empty, dials 85, 87 are in the positions shown in FIG. 1A indicating that belts 31-37 are taut or tensioned. As material is fed into chamber 12 (FIG. 2A) and the bale grows in size and assuming the bale has a substantially uniform diameter across the width of the baler, belts 31-37 remain taut and the position of feelers 71, 73 remains unchanged from that shown in FIG. 1A to indicate the taut condition of belts 31-37 and the substantially uniform diameter of the bale across the width of the baler at that point in the bale formation process. If a substantially uniform diameter is obtained for a completely formed bale, the position of feelers 71, 73 and of dials 85, 88 is shown in FIG. 1B and is identical to that shown in FIG. 1A.

If at any time during the formation of the bale, it becomes "pear" shaped by feeding too much hay into either the right or left side of the baler, tensioning and take-up mechanism 68 is pivoted clockwise (FIG. 1A) to accommodate the largest diameter portion of the bale. For example, as shown in FIG. 2A, when the larger diameter portion of the bale is on the right, belt 31 is slackened, feeler 71 is pivoted clockwise (FIG. 1A) and belt 37 remains tensioned. This condition is indicated on dials 85, 88 and informs the operator that corrective action should be taken by feeding material into the left side of the baler until 88 again indicates belt 31 is tensioned.

If, as shown in FIG. 2B, the bale becomes "egg" shaped by feeding too much material into the center of the baler, take-up mechanism 68 is again pivoted clockwise to accommodate the larger diameter central portion. As a result both belts 31, 37 are slackened and feelers 71, 73 are pivoted clockwise (FIG. 1A). This condition is indicated on dials 85, 88. The operator may then take corrective action by successively feeding material (1) to first one side until the corresponding dial indicates a taut belt condition has been achieved on that one side and (2) then to the other side until the corresponding dial indicates a taut belt condition on this side.

It has been found that the use of only two feelers 71, 73 in engagement with the outermost belts 31, 37 is sufficient to inform the operator of the bale shapes which have been found to be troublesome and require corrective action. As an example, the formation of a spool-shaped bale does not appear to occur as material appears to gravitate inherently to the center. Thus, there is no need to provide a feeler disposed centrally of the baler width.

Reference is now made to FIG. 5 which shows a fragmentary view (similar to FIG. 3) of a second embodiment of a gauge 101 for indicating the relative diameters of a bale being formed in the bale-forming chamber of the baler at two axially-spaced points on the bale periphery. Gauge 101 will also be explained in connection with baler 10 shown in FIGS. 1, 2A, 2B herein and disclosed in more detail in U.S. Pat. No. 4,150,527. In accordance with the features of this embodiment, a gauge 101 includes a pivotally mounted, integral feeler 103, a first arm 105 of which is in engagement with outer belt 37 of baler 10 and a second arm 107 of which is pivotably and slidably coupled to a transmitting means 109 for transmitting from feeler 103 to a remotely located indicator 108 a signal indicative of whether belt 37 is tensioned or slackened. Arms 105, 107 are fixed to a pivot 111 which serves as a pivotable mounting therefor in a bracket 113. Arm 105 is spring biased clockwise to engage belt 37 in a conventional manner such as a spring 110 connected between arm 105 and bracket 113. In this embodiment, transmitting means 109 comprises a master piston-type fluid pump 112, a slave piston-type fluid pump 114, and a tube 115 filled with fluid and interconnecting master and slave pumps 112, 114. Indicator 108 includes an indicator arm 116 slideably and pivotably connected at one (right) end to the remote end of a reciprocatable piston 117 of slave pump 114 and is operated responsive to the fluid pressure exerted on piston 117 via master pump 112. Pump 112 is in turn controlled by the pivotal position of feeler 103. The tensioned or slackened condition of left, outermost belt 31 is monitored by a feeler 121, transmitting means 122 including master and slave pumps 123, 125—all of which are identical to the corresponding components for the right side of the baler explained above. A reciprocatable piston 127 of slave pump 125 is slideably and pivotably connected to the other (left) end of indicator arm 116, thereby permitting a signal indicative of the tensioned or slackened condition of belt 31 to be transmitted to the left side of arm 115. The rods of the slave pistons 127, 117 are fully extended when the left and right belt 31, 37 are taut and are fully retracted when the left and right belt 31, 37 are slackened. In FIG. 5, the condition illustrated by indicator 108 is that left belt 31 is slackened while the right belt 37 is taut which indicates that the diameter of the bale on the right side is substantially larger than on the left side. In this embodiment, by interconnecting transmitting means 109, 122 to a unitary indicator arm 116, the bale shape is more graphically illustrated by indicator 108 compared to indicator 86. However, it will be appreciated by those skilled in the art that an electrically-operated indicator with a single indicator arm analogous to the mechanically operated indicator arm 116 may be used in connection with the first embodiment of this invention in lieu of indicator 86.

In summary, it will also be appreciated that gauges 11, 101 do not measure the absolute diameter of the bale but measure a condition—the slackened or tensioned conditions of belts 34, 42 engaging the bale at two axially-spaced locations on the bale periphery—indicative of the relative diameter of the bale at the two points. The correlation between relative diameters and the degree of tensioning in the belts results from the fact that belt-tensioning and take-up mechanism 68 is adjusted upwardly to enlarge the bale-forming chamber 12 substantially responsive to the largest diameter portion of the bale. Thus, the tension on the belt(s) engaging the largest diameter portion is maintained while the tension on the belts engaging the smaller diameter portions is partially or wholly relieved.

It will be appreciated by those skilled in the art that while the invention has been explained in accordance with certain preferred embodiments, other modifications and variations will be apparent to those skilled in the art. For example, it will be appreciated that a gauge in accordance with this invention has application to a variety of other baler designs such as the ground rolled type exemplified in U.S. Pat. No. 4,012,892, and the off-ground rolled types having a vertically (rather than horizontally) fed baling chamber as exemplified in U.S. application, Ser. No. 585,851, filed June 11, 1975, now U.S. Pat. No. 4,330,985 granted May 25, 1982 and assigned to the assignee of the invention herein. Accordingly, the invention herein is intended to comprehend all such modifications and variations as are within the true spirit and scope of the appended claims.

I claim:

1. In a machine for forming cylindrical bales of crop material, said machine comprising:
   a mobile frame;
   a plurality of loop means respectively supported on said frame for movement in a plurality of laterally spaced parallel planes;
   a bale-forming chamber having a bale-winding axis extending substantially perpendicular to said planes, said chamber defined by said frame and by a span of each of said loop means; and
   a tensioning and take-up mechanism for lengthening the span of each loop means defining said chamber and thereby increasing the size of said chamber transverse to the bale-winding axis responsive to the increasing diameter of the largest diameter portion of a bale being wound in said chamber wherein the improvement comprises:
   a gauge including sensing means for sensing the relative diameters of a bale being formed in said chamber at two axially-spaced points on the bale periphery and continuously generating first and second signals corresponding to the relative diameters, visual indicating means responsive to said first and second signals for continuously indicating the relative diameters of said bale at said spaced points; and transmitting means coupled between said sensing means and said visual indicating means for transmitting said first and second signals to said visual indicating means.

2. The improvement of claim 1 wherein said gauge comprises:
   sensing means including a pair of feelers respectively engaging two of said loop means, one of said two loop means having a span engaging the bale at one of said axially-spaced points, the other of said two loop means having a span engaging the bale at the second axially-spaced points, each feeler moveable responsive to the variation in tension of said belt.

3. The improvement of claim 2 wherein said transmitting means comprises:
   a pair of master piston-type fluid pumps respectively coupled to and operated responsive to the position of said pair of feelers;
   a pair of slave piston-type fluid pumps; and
   a pair of tubes respectively interconnecting one of said pair of master to one of said pair of slave fluid pumps, and another of said pair of master to another of said pair of slave fluid pumps.

4. The improvement of claim 2 wherein said transmitting means comprises an electrical circuit including a pair of rheostats respectively connected to said pair of feelers for generation of first and second output signals respectively proportional to the movement of said pair of feelers.

5. The improvement of claim 3 wherein said pair of slave piston-type pumps form part of said indicating means and are mounted in side-by-side relationship with respective piston rods projecting therefrom and said indicating means further including a link having its opposite ends respectively pivotally coupled to said piston rods.

6. The improvement of claim 4 wherein said indicating means comprises first and second electrically responsive dial indicators mounted in side-by-side relationship and respectively being coupled to said circuit for receiving the signals generated by said pair of rheostats.

7. In a method for measuring the uniformity of diameter of a cylindrical bale being formed in a baler, said baler comprising a plurality of endless, side-by-side, flexible loop means for defining an adjustable bale-forming chamber having an axis transverse to the direction of the movement of the baler and for compacting and rolling a bale during formation in said chamber, said method comprising the steps of:
   driving said plurality of loop means in a plurality of laterally spaced parallel planes;
   tensioning said plurality of loop means; and
   increasing said chamber in size responsive to the increasing diameter of the largest axially spaced location on the periphery of a bale being formed in said baler, the improvement comprising the steps of:
   sensing over a range of diameter differences the relative diameters of a bale during formation at two axially spaced points on the bale periphery, and providing a continuous visual indication of the sensed diameter differences.

* * * * *

UNITED STATES PATENT AND TRADEMARK OFFICE
CERTIFICATE OF CORRECTION

PATENT NO. : 4,517,795

DATED : 21 May 1985

INVENTOR(S) : Gerald F. Meiers

It is certified that error appears in the above-identified patent and that said Letters Patent is hereby corrected as shown below:

Column 8, lines 3-5, delete "gauge comprises: sensing means including" and insert -- sensing means includes --.

Signed and Sealed this

Twenty-seventh Day of May 1986

[SEAL]

Attest:

DONALD J. QUIGG

Attesting Officer

Commissioner of Patents and Trademarks